United States Patent [19]
Priest

[11] Patent Number: 5,390,271
[45] Date of Patent: Feb. 14, 1995

[54] OPTICAL INTERFACE FOR HYBRID CIRCUIT

[75] Inventor: John F. Priest, Tomball, Tex.

[73] Assignee: Litton Systems, Inc., Beverly Hills, Calif.

[21] Appl. No.: 55,316

[22] Filed: May 3, 1993

[51] Int. Cl.⁶ .............................................. G02B 6/42
[52] U.S. Cl. ........................................ 385/92; 385/31; 385/33; 385/36; 385/48; 385/93
[58] Field of Search ............... 385/14, 31, 33, 34, 385/35, 36, 39, 47, 48, 51, 88, 92, 93, 94

[56] References Cited

U.S. PATENT DOCUMENTS

| | | | |
|---|---|---|---|
| 4,130,343 | 12/1978 | Miller et al. | 385/49 |
| 4,756,590 | 7/1988 | Forrest et al. | 385/94 |
| 4,897,711 | 1/1990 | Blonder et al. | 385/88 |
| 4,981,334 | 1/1991 | Sniadower | 385/31 |
| 5,073,003 | 12/1991 | Clark | 385/33 |
| 5,155,786 | 10/1992 | Ecker et al. | 385/94 |
| 5,163,113 | 11/1992 | Melman | 385/31 |

Primary Examiner—Frank Gonzalez
Attorney, Agent, or Firm—Elliott N. Kramsky

[57] ABSTRACT

Apparatus is provided for coupling the optical energy conducted through an optical fiber to an electro-optic hybrid element, such as a photodetector, that is positioned within a hybrid casing. The outer jacket of the fiber is stripped, cleaved to 45 degrees and silvered or coated with a dielectric to form a mirror for directing the optical energy through the side of the cladding. A window, transparent to a predetermined bandwidth of the optical energy, is provided in the lid of the case overlying the electro-optic element. The mirrored end of the fiber is positioned above the window and the element while the fiber is fixed to the top of the lid of the casing. The arrangement requires no ferrule and permits bakeout and testing of the hybrid package prior to engagement of the optical fiber.

11 Claims, 1 Drawing Sheet

U.S. Patent   Feb. 14, 1995   5,390,271
FIG. 1
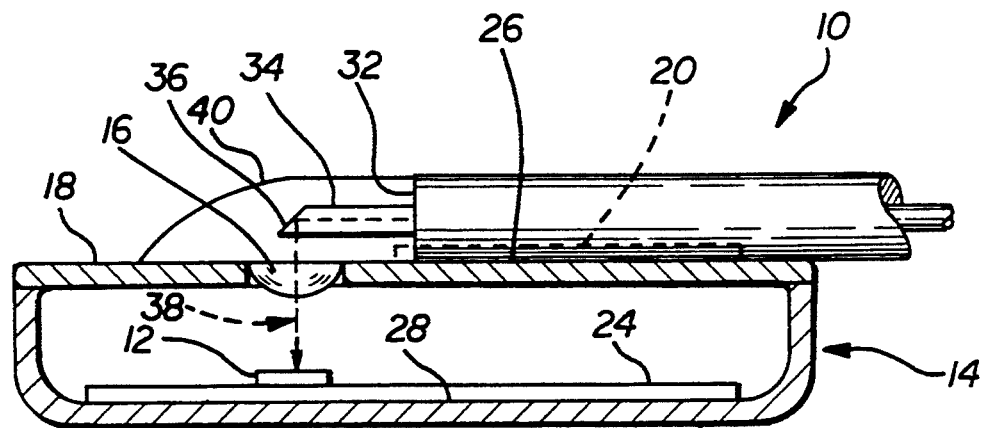
FIG. 2a
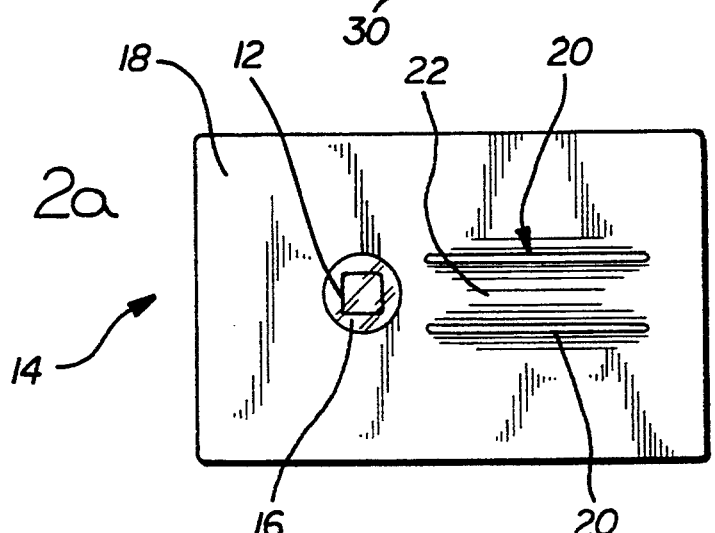
FIG. 2b
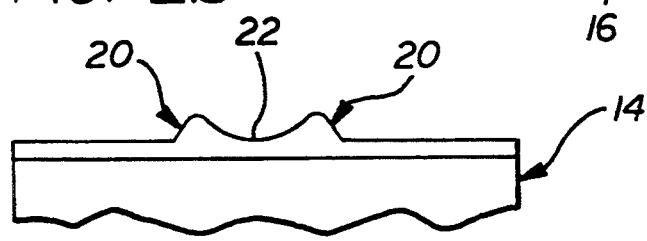
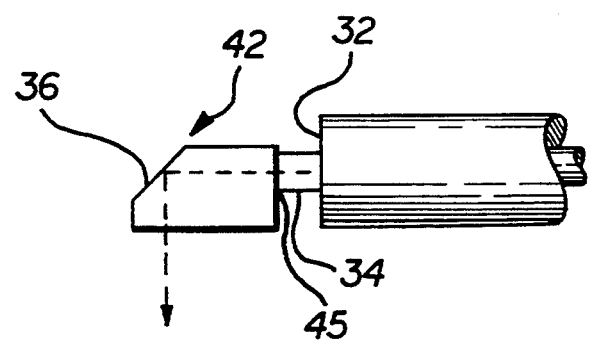
FIG. 3

OPTICAL INTERFACE FOR HYBRID CIRCUIT

BACKGROUND

1. Field of the Invention

The present invention relates to apparatus for coupling optical energy from a fiber to a hybrid circuit of the type that includes at least one electro-optic element. More particularly, this invention pertains to an optical interface arrangement that facilitates the complete fabrication and testing of such a hybrid package prior to engagement to the pigtail of an optical fiber conductor.

2. Description of the Prior Art

Optical networks often include hybrids. Hybrid integrated circuits consist of a combination of two or more integrated-circuit types or one integrated-circuit type and discrete elements. Opto-electronic hybrid circuits often include photodetectors for converting an optical signal delivered by an optical fiber network to a corresponding electrical signal. Photodetector devices may be of various compositions including silicon, indium, gallium arsenide, and gallium arsenide with cadmium sulfide. Many precision applications require that the hybrid circuit elements be contained or enclosed within a hermetically-sealed case. The fabrication of such circuits commonly includes a bakeout process prior to sealing for purifying the sealed environment within the case by outgassing such contaminants as hydrocarbons, EPOXY resins and solder flux.

In conventional optical networks that include electro-optical hybrids, an optical fiber conductor is coupled to the hybrid package through a ferrule in the side of the hybrid case. The connection of the optical fiber to the hybrid occurs prior to device testing and bakeout. The specifications for bakeout can be stringent, particularly in military applications. The outgassing of substantial amounts of contaminants can significantly lengthen manufacturing processes.

Optical fibers are typically encapsulated in jackets of acrylic plastic material of limited temperature tolerance. Generally such material should not be subjected to temperatures in excess of 105 degrees Centigrade for the most common fiber jackets. This can significantly affect (lower) the temperature of bakeout in conventional arrangements wherein the fiber is fixed to the hybrid case. As a result, the time required for environmental purification is affected (lengthened). At the present time, bakeout for a hybrid with fiber pigtail attached typically requires an eight (8) hour process. Furthermore, since circuit testing is forestalled until bakeout has been completed, device yield is yet even more significantly limited.

SUMMARY OF THE INVENTION

The present invention addresses and overcomes the foregoing problems of the prior art by providing apparatus for coupling the optical energy conducted through an optical fiber surrounded by a fiber jacket to an electro-optic element positioned within a case having a substantially-planar lid. In the invention, such lid includes a defined region, overlying the electro-optic element, which is characterized by transparency to a predetermined bandwidth of the optical energy. Means, associated with the terminal end of the fiber, are provided for directing a predetermined bandwidth of the optical energy in a direction substantially orthogonal to the direction of propagation of optical energy within the fiber. Finally, means are provided for positioning the fiber adjacent the lid so that the predetermined bandwidth of the optical energy is directed through the defined region and at the electro-optic element.

The preceding and other features and advantages of this invention will become further apparent from the detailed description that follows. Such detailed description is accompanied by a set of drawing figures. Numerals of the drawing figures, corresponding to those of the written description, point to the features of the invention. Like numerals refer to like features throughout both the written description and the drawing figures.

BRIEF DESCRIPTION OF THE DRAWINGS

FIG. 1 is a side sectional view of an arrangement in accordance with the invention for interfacing an optical fiber with a hybrid circuit;

FIGS. 2a and 2b are top plan and side elevation views, respectively, of the fiber receiver located at the top of the lid of a hybrid case in accordance with the invention; and FIG. 3 is a side elevation view of an alternative embodiment comprising a reflector for use in the invention.

DETAILED DESCRIPTION

Turning to the drawings, FIG. 1 is a side sectional view of the invention. As shown, a fiber 10 transmits optical energy to a hybrid circuit comprising a photodetector 12 located within a casing 14. As already mentioned, it has been conventional in the prior art to provide a ferrule in the side of the casing 14 whereby the fiber 10 can access the interior to deliver optical energy to the hybrid circuit. The required ferrule substantially complicates design of the hybrid package and ultimately leads to increased bakeout times that diminish device yield significantly.

In the present invention, the problems associated with the above-described arrangements are avoided by an optical interface arrangement that allows bakeout to take place before the optical fiber is coupled to the casing 14. In the prior art, the fiber 10 was necessarily attached to the hybrid case through the ferrule at the time of bakeout to assure sealing of the casing 14 which, as mentioned, includes a sidewall ferrule for interior access.

In the present invention, the fiber 10 is never inserted into the hybrid casing 14. Rather, a window 16 is provided in the upper lid 18 of the casing 14 to admit optical energy and to allow the coupling of such energy to an optical signal receptor device such as the photodetector 12 situated within the hybrid package. The window 16 may be planar or may comprise a focusing lens as shown. Such design choice will depend on factors including the size of the optically-active surface of the photodetector 12, the intensity of the optical energy transmitted through the fiber 10 and the like. In some applications, the window 16 may be formed of material chosen for transparency to a particular bandwidth of optical energy, thereby providing a filtering function.

The fiber 10, as mentioned, is never inserted into, and therefore does not breach, the casing 14. Rather, a cradle 20 is provided atop the upper lid 18 for positioning and accommodating the fiber 10 exteriorly of the casing 14. The cradle 20, shown more clearly in FIGS. 2a and 2b, is preferably a molded structure that forms a channel-like shape, including a central concave region 22 for receiving the end of the optical fiber 10. In the event that the cradle 20 and the lid 18 are formed as a single integral element, it should preferably be of appropriate ceramic or corrosion-resistant metal fabrication. It may, for example, be fabricated of the metal that is commercially available under the trademark KOVAR. A ceramic base 24 to which the photodetector 12 is soldered or bonded by an appropriate EPOXY resin, should possess a coefficient of thermal expansion that closely matches that of the casing 14. Structural EPOXY may be employed both for securing the fiber 10 to the cradle 20 and the base 24 to the bottom 30 of the hybrid casing 14 at the indicated adhesive layers 26 and 28 respectively.

Since the fiber 10 does not directly access the hybrid casing 14, means must be provided for directing optical energy from it to the photodetector 12. A window 16, mentioned earlier, is aligned with the photodetector 12. The acrylic plastic jacket 32 of the fiber 10 is stripped from a region adjacent the terminal end to expose the fiber cladding or central core 34 that conducts the majority of the optical energy. The end of the fiber 34 is cleaved to form a 45 degree surface 36 that forms a flat ellipsoidal plane when viewed from the front. The cleaved end of the fiber may be coated with a reflective coating, such as silver, or may be coated with dielectric coatings designed to yield a 100 per cent coefficient of reflection at the cleaved end of the fiber 36.

The inclined planar end 36 of the fiber 34 provides a reflective surface for redirecting the optical energy that propagates (longitudinally) within the cladding 34 in an orthogonal downward direction 38, through the window 16 and to incidence with the photosensitive upper region of the photodetector 12. The planar end 36 may be silvered or may comprise a dichroic mirror for reflecting a preselected bandwidth of the incident optical energy. As in the selection of material for forming the window 16, the type of reflective surface of the planar end 36 will depend upon the intended application. The selection and evaluation of the possible choices, dependent, in part, upon the bandwidth of interest, signal noise tolerance and like considerations, are matters well known in the art.

The end of the fiber 10 is encapsulated within a uv-curable, index matching EPOXY resin 40. Such resin 40 acts to reduce distortion that would otherwise be caused by the cylindrical shape of the cladding 34. Thus the optical signal incident at the sensitive upper surface of the photodetector 12 provides a true picture of the optical signal that is propagating within the fiber 10.

It is, of course, particularly important that the photodetector 12, the planar end 36 and the window 16 be properly aligned. A two stage process may be employed to position the fiber 10 after bakeout of the hybrid circuit. A coarse alignment can be made by positioning the surface 36 over the cradle 20 and rotating the fiber 10 until maximum photodetector 12 response is observed. The translational position can then be determined by sliding the fiber 10 along the cradle 20 until the photodetector 12 indicates a loss of optical signal. The position of the die center is then halfway between the two points of optical signal loss. The other axis can be controlled by some translation and by rotation using a similar technique. The lens 16 is designed to focus over approximately 25 percent of the die area to reduce saturation and the effect of defects. The cleaved end of the fiber is held in the correct position following alignment by means of optical EPOXY encapsulation 40 of the end of the fiber. The index of reflection of the EPOXY matches the index of refraction of the fiber and lens. The optically transparent EPOXY in the frequency band of interest eliminates or greatly reduces optical losses caused by the curved outer surface of the fiber and reflections from the optical window.

FIG. 3 is a side elevation view of an alternative embodiment of the portion of the invention for redirecting light traveling through the fiber 10 to the optoelectronic circuitry within the casing 14. As shown in the preceding figures, such redirected optical energy passes through the window 16 provided at the top surface (or lid) 18 of the casing 14. The alternative device comprises a prismatic element 42 that is fixed to the cladding (after the acrylic jacket thereof is stripped at end 32) by means of appropriate optical EPOXY. The prismatic element 42 includes a reflective planar surface 44 that is inclined with respect to the optical axis of the fiber 10. The surface 44 corresponds functionally to the planar end 36 of the cladding in the embodiment illustrated in FIGS. 1, 2a and 2b. As before, the surface 44 may be of totally or selectively reflective character. Further, the prismatic element 42 may be of such dimensions and design as to eliminate the resin 40 encapsulation required in the embodiment of the preceding figures. In such case, a thin layer of optical EPOXY may be provided at the bottom thereof for securing the element 42 to the upper surface of the window 16 (not shown in FIG. 3) and a thin layer of optical epoxy may be provided between the element and the end of the fiber 45.

Thus it is seen that the present invention provides an improved optical interface for a hybrid circuit. By employing the teachings of this invention which features the non-invasive attachment of the optical fiber pigtail to the hybrid casing, one can obtain enhanced device yields as a consequence of increased bakeout temperatures.

While the present invention has been illustrated with reference to its presently-preferred embodiment, it is not limited thereto. Rather, this invention is limited only insofar as it is defined by the following set of patent claims and includes within its scope all equivalents thereof.

What is claimed is:

1. Apparatus for coupling the optical energy conducted through an optical fiber surrounded by a fiber jacket to an electro-optic element positioned within a case having a substantially-planar lid comprising, in combination:
   a) said lid including a defined region overlying said element characterized by transparency to a predetermined bandwidth of said optical energy;
   b) the terminal end of said fiber including a planar surface of reflective character for directing said optical energy in a direction substantially orthogonal to the direction of propagation of optical energy within said fiber; and
   c) means for positioning said terminal end of said fiber adjacent said lid so that said predetermined bandwidth of said optical energy is directed through said defined region and at said element.

2. Apparatus as defined in claim 1 wherein said defined region comprises a window characterized by a predetermined bandwidth.

3. Apparatus as defined in claim 2 wherein said window is planar.

4. Apparatus as defined in claim 2 wherein said window comprises an optical lens.

5. Apparatus as defined in claim 1 further characterized in that:
   a) said planar surface is formed at the terminal end of said fiber; and
   b) said planar surface is inclined at an angle of 45 degrees with respect to the optical axis of said fiber.

6. Apparatus as defined in claim 5 wherein the region between said planar surface and said defined region is encapsulated in optical resin.

7. Apparatus as defined in claim 1 wherein said planar surface is further characterized in that:
   a) said surface is formed in a prismatic element; and
   b) said element is attached to the terminal end of said fiber.

8. Apparatus as defined in claim 7 wherein the bottom of said prismatic element is fixed to said defined region by means of optical resin.

9. Apparatus as defined in claim 8 wherein said optical resin is an index of refraction matching resin.

10. Apparatus for coupling the optical energy conducted through an optical fiber surrounded by a fiber jacket to an electro-optic element positioned within a case having a substantially-planar lid comprising, in combination:
   a) said lid including an internal defined region overlying said element characterized by transparency to a predetermined bandwidth of said optical energy;
   b) means associated with the terminal end of said fiber for directing said optical energy in a direction substantially orthogonal to the direction of propagation of optical energy within said fiber; and
   c) a straight channel extending substantially from an edge of said lid to said internal defined region, said straight channel having a concave upper surface for positioning the terminal end of said fiber adjacent said lid whereby said optical energy is directed through said defined region and at said element.

11. Apparatus as defined in claim 10 wherein said channel is integral with said lid.

* * * * *